Figure 1:
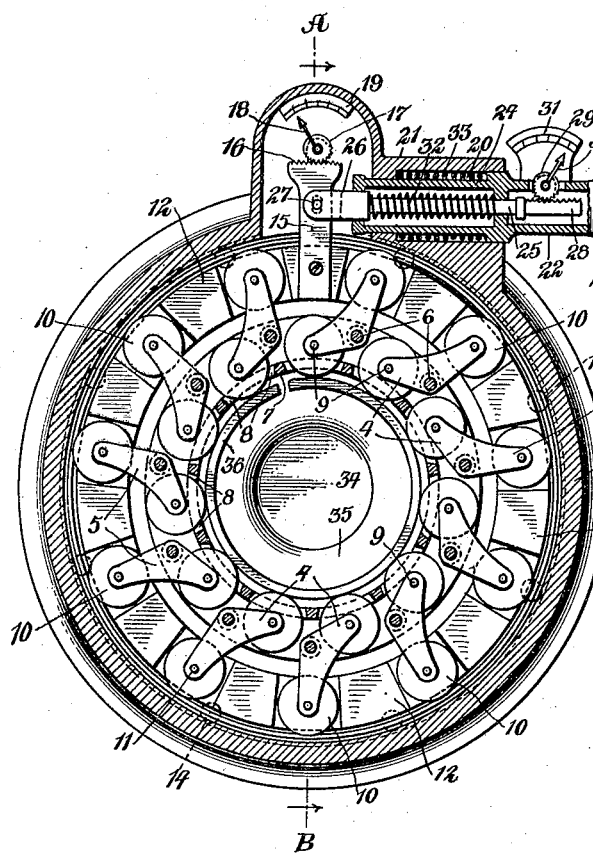

Oct. 28, 1924.

J. LAESSKER 1,513,610

PROCESS AND APPARATUS FOR TESTING THE SPRING POWER OF PISTON RINGS

Filed April 23, 1921

INVENTOR
Jean Laessker
BY
C. W. Fairbank
ATTORNEY

Patented Oct. 28, 1924.

1,513,610

UNITED STATES PATENT OFFICE.

JEAN LAESSKER, OF ARBON, SWITZERLAND, ASSIGNOR TO SOCIETE ANONYME ADOLPHE SAURER, OF ARBON, SWITZERLAND.

PROCESS AND APPARATUS FOR TESTING THE SPRING POWER OF PISTON RINGS.

Application filed April 23, 1921. Serial No. 463,817.

*To all whom it may concern:*

Be it known that I, JEAN LAESSKER, a subject of the King of Sweden, and a resident of Arbon, Switzerland, have invented certain new and useful Improvements in Processes and Apparatus for Testing the Spring Power of Piston Rings, of which the following is a specification.

In order that a piston ring shall exert the desired definite spring pressure against the cylinder wall after introduction into the cylinder, knowledge as to the resiliency of the ring is requisite. Even when the piston rings are prepared according to computations carried out with the greatest of care, the spring power may be influenced by the softness of the cast iron, by defects in the casting, etc. In quantity production of piston rings and particularly for automobile motors, the testing of the piston rings for uniform pressure is of importance in actual use.

In carrying out my invention, the piston ring is pressed together by a tensioning means and the requisite force is measured by means of a measuring device influenced by the tensioning means, so that the expanding pressure of the piston ring may be definitely ascertained.

As the indication of the measuring device bears a definite relation to the force requisite for compressing the piston ring, it is possible to determine by comparison with the readings for a perfect ring whether the tested ring meets requirements when it has been compressed or reduced to the desired diameter.

In order to grip the piston ring uniformly about its entire periphery so that in testing it is subject to the same relations as in actual use and operation, the tensioning device, in the preferred form of my invention, includes a series of bell cranks which are movable about axes located upon a circle, and the inner arms of which contact the piston ring to be tested, while an operating mechanism coacting with the measuring apparatus cooperates with the outer arms for uniform rotation of the bell cranks. The free ends of the inner arms of the bell crank always remain in a true circle during the oscillation of the cranks, so that the piston ring will not lose its circular form in the course of tests. Preferably the inner arms are provided with rollers which rest against the piston rings, so that only radially directed force will act upon the ring in compressing the same.

For effecting the uniform turning of all of the bell cranks, the drive is preferably effected by a rotatable ring coaxial with the bell crank carrying ring, which rotatable ring is provided with guides with which the outer arms of the bell cranks coact. The accurately uniform rotation of the bell cranks can be secured by providing their outer ends with rollers cooperating with the guides of the operating ring, the rollers being located on a circle coaxial with the bell crank supporting ring. By this arrangement, forcing or jamming in the course of rotation of the operating ring is avoided.

Preferably, the piston ring to be tested will be carried or supported solely by the bell cranks during the test. Thus, I avoid any friction of the ring against any stationary part during the compression of the piston ring.

For measuring the spring power of the piston ring, a spring is disposed between two relatively movable members which turn the bell crank operating ring, and the deflection of this spring which permits said relative movement corresponds to the pressure exerted in compressing the piston ring and is indicated by a suitable indicating device.

The entire control apparatus is made simple and compact in construction preferably by having the measuring means and the tensioning means united in a unitary structure. For this purpose a longitudinally shiftable push button is mounted in the housing of the driving ring to serve as one of said relatively movable members and carries a pinion connected to the indicating means which pinion meshes with a rack on the other of said relatively movable members.

In order to be able to determine immediately what angle of rotation of the driving ring corresponds to a predetermined force of the measuring spring, the bell crank operating ring cooperates with means indicating its angle of rotation. Preferably this indicating means also is embodied in a unitary construction with the tensioning means, in that, a gear wheel is disposed in the housing for the operating ring which gear wheel is connected with indicating means and meshes with a gear element mounted on the operating ring.

Figure 2:
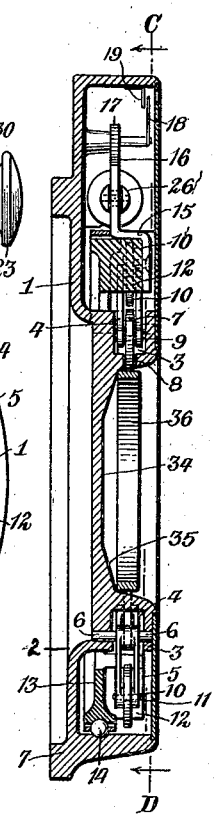

In the drawing there is shown one embodiment of a testing apparatus embodying my invention:

Fig. 1 is a longitudinal section taken on the line C—D of Fig. 2, and Fig. 2 shows a cross-section upon the line A—B of Fig. 1.

The body or frame part of the device includes a housing 1 which presents an annular hub or flange portion 2, which in its outer peripheral face is provided with an annular groove 3 in which the bell cranks 4—5 are pivotally mounted, the axes of rotation 6 of the latter being disposed upon a circle concentric with the housing. The inner arms 4 of the bell crank levers carry rollers 7 of equal size, the innermost portions of which project freely to the inner peripheral face of the hub or flange 2, through corresponding recesses 8 in the latter and are adapted to engage with the outer surface of the piston ring to be tested. The outer arms 5 of the bell cranks carry rollers 10, the axes of rotation 11 of which are disposed upon a circle coaxial with the hub 2. These rollers 10 are disposed between projections 12 spaced for proper clearance upon a ring 13 which latter is mounted within the housing 1 outside of but coaxial of hub 2 upon ball bearings 14 for easy rotation. The projections 12 are tapered toward the interior in order to provide a satisfactory guide having parallel surfaces for the rollers 10, during the oscillation of the bell cranks 4—5.

Upon the ring 13 is fastened an arm 15, the outer end of which is formed as a tooth segment 16 meshing with a pinion 17 disposed within an extension of the housing 1. Operatively connected to the pinion is a pointer 18 which coacts with a scale 19 disposed upon the housing 1.

For oscillating the ring and swinging the bell crank there is provided a longitudinal shiftable plunger 22, the outer end of which is formed as a push button 23 and the inner end of which forms a tubular part 24 of reduced diameter guided in a passage in a lug 21 formed on the housing. This serves as a support for a longitudinally shiftable rod 25 joined at one end to the arm 15 by means of a fork 26 having a pin in a slot 27 extending lengthwise of the arm 15. At the other end, the rod 25 is formed as a rack 28, cooperating with a pinion 29 mounted in the plunger 22. Rigid with the pinion is a pointer 30 which coacts with a scale 31 also carried by the plunger 22. In the tubular part 24 there is a measuring spring 32 having one end pressing against the plunger 22 and the other end pressing against the fork 26 upon the rod 25. In the lug 21 there is disposed a return spring 33 for the plunger and push button 23.

The housing 1 has a transverse wall 34 closing the end of the space encircled by the hub 2 and which receives the piston ring 36 to be tested. The surface of this wall constitutes a stop extending from the recesses 8 at the inner periphery of the hub 2 inwardly and rearwardly as a conical surface, the apex of which is at the center of the wall 34.

In the position shown, the push button 23 is at rest, the return spring 33 holding the circle of contact of the innermost points of rollers 7 is at a maximum. In operation the piston ring 36 to be tested is inserted into the hub or supporting ring 2 of the bell crank levers until it contacts the conical surface 35 of the wall 34. The piston ring then rests with equal pressure against the rollers 7. If the push button 23 is now manually pushed in, the measuring spring 32 will be compressed by means of the plunger 22, and the ring 13 will be rotated by the action of this spring. As a result of this rotation all the rollers 10 of the bell cranks will be moved by the projections 12 and the bell cranks will, therefore, be turned simultaneously about their axes 6 and to an equal extent. The inner rollers 7 also will thereby be uniformly moved inwardly in such manner that their innermost points will always define a circle. The rollers 7 will rest against the piston ring 36 and gradually press the latter together uniformly about its entire periphery.

In the rotation of the bell cranks 4—5, the rollers 10 will roll along the surfaces of the projections 12 so that forcing or jamming is avoided and the accuracy of the simultaneous motion of all of the bell cranks is assured. The inner rollers 7 roll upon the piston ring 36 so that in the course of test, only radially directed force will act upon the piston ring, whereby the latter will maintain its circular form.

The angle of rotation of the driving ring 13, that is, the extent to which the piston ring 36 would be pressed together when disposed in actual operation in the cylinder, will be indicated upon the scale 19 by the pointer 18.

The force required for pressing together the piston ring 36 to the diameter corresponding to the angle of rotation, that is, the sum of the individual forces of the rollers 7 acting upon the piston ring, will be indicated upon the scale 31 by the pointer 30, for every position of this pointer 18. In the inward displacement of the push button 33, the rod 25 will also move in the same direction but will be retarded with respect to the push button in proportion to the increase of resistance, which spring 32 must overcome in the rotation of the bell crank operating ring. This resistance, however, corresponds to the pressure upon the piston ring at the time. The pinion 29 will, therefore, be rotated by the rack 28 in a counter clockwise direction by the relative movement of the parts 25 and 22 during the endwise movement of both.

The spring 32 may be of such strength, and the scale 31 can be so calibrated as to either indicate the force necessary for pressing together the piston ring, allowing for the various transformations of forces, or it may indicate only the desired normal force with the permissible tolerance, so that it may be recognized by the excess deflection, whether or not the piston ring is to be rejected.

The push button 23 will be returned to its position of rest when released, by the action of the return spring 33, at which time the piston ring 36 may be removed from the supporting hub 2.

In the course of the test, the piston ring 36 is held exclusively by the rollers 7 since the ring being pressed together will be released immediately from the surface 35 by reason of the conical form of the latter. The measurement will, therefore, not be influenced by an added supporting friction of the piston ring.

The support ring for the bell cranks and the operating ring, by moving them, can, of course, be arranged in other relations and the construction of the measuring apparatus and the connecting elements with the operating apparatus for the bell cranks may be varied.

Having thus described my invention, what I claim as new and desire to secure by Letters Patent is:

1. The process for testing piston rings consisting in applying pressure radially at a plurality of spaced points around the periphery of the piston ring to effect a predetermined reduction in diameter while maintaining circular form and measuring the sum of the forces applied at all of said points.

2. The process of testing piston rings including applying force radially through equal distances at a plurality of uniformly spaced points about the periphery of the piston ring to effect a reduction in diameter of the piston ring while maintaining circular form and measuring the sum of the forces applied at said points for different definite reductions in diameter.

3. The process of testing piston rings consisting in applying a definite force applied through equal distances at a plurality of points spaced uniformly about the periphery of the piston ring and measuring the reduction in diameter resulting from such application of force.

4. An apparatus for testing the spring power of piston rings including means for simultaneously applying pressure through equal distances at a plurality of points spaced at uniform distances apart about the periphery of the piston ring and means for measuring the resulting reduction in diameter.

5. An apparatus for testing the spring power of piston rings including means for applying pressure at a plurality of points spaced at uniform distances apart about the periphery of the piston ring, to reduce the diameter while maintaining true circular form, means for measuring the sum total of the pressures applied and means for measuring the resulting reduction in diameter.

6. An apparatus for testing the spring power of piston rings including an annular series of bell crank levers pivoted to swing in the same plane and having their inner ends adapted to act substantially radially upon a piston ring and means for simultaneously moving the opposite ends of the bell crank levers substantially circumferentially of the piston ring to effect the application of compressing action to the latter.

7. An apparatus for testing the spring power of piston rings including an annular series of bell crank levers having the inner ends adapted to act substantially radially upon a piston ring and a ring mounted for oscillation for simultaneously moving the opposite ends of the bell crank levers substantially circumferentially of the piston ring to effect the application of compressing action to the latter.

8. An apparatus for testing the spring power of piston rings including an annular series of bell crank levers having their inner ends adapted to support and act substantially radially upon the piston ring to be tested, an annular member operatively engaging with the opposite ends of said levers and mounted for oscillation, means for oscillating said member and means for measuring the power applied to effect a definite angle of oscillation corresponding to a definite reduction in diameter of the piston ring.

9. An apparatus for testing the spring power of piston rings including an annular member, means for reducing the piston ring in diameter upon oscillation of said member, means for measuring the reduction in diameter of the ring for a given angle of oscillation of said member, and means for measuring the power required to effect a definite angle of oscillation of said member.

10. An apparatus for testing the spring power of piston rings including an annular series of bell crank levers, each having a roller at its outer end and a roller at its inner end, said inner roller serving to engage with the periphery of a piston ring, an annular operating member having operative engagement with the outer rollers to move the latter substantially circumferentially and the inner rollers substantially radially of the piston ring.

11. An apparatus for testing the spring power of piston rings including an annular member coaxial with the piston ring, means for reducing the diameter of the piston ring upon oscillation of said member, means for oscillating said member including two telescopic members having spring connections, one of said last mentioned members being connected to said first mentioned member and indicating means operated upon a relative movement of said second mentioned members.

12. An apparatus for testing the spring power of piston rings, including an annular member mounted for oscillation about the axis of the ring to be tested, means for reducing the ring in diameter upon an oscillation of said member, an operating device including two telescopic sections, one connected to said member and having spring connections between said sections whereby the oscillation of said member corresponds to the relative movement of said sections and the deflection of said spring means.

13. An apparatus for testing the spring power of piston rings, including an annular member mounted for oscillation about the axis of the ring to be tested, means for reducing the ring in diameter upon an oscillation of said member, an operating device including two telescopic sections, one connected to said member and having spring connections between said sections whereby the oscillation of said member corresponds to the relative movement of said sections and the deflection of said spring means, and measuring means including coacting parts carried by said sections and operated upon the relative movement of the latter.

14. An apparatus for testing the spring power of piston rings including an oscillatory member, means for compressng the piston ring upon the oscillation of said member, a rod connected to said member, a push button, a spring connection between said push button and said rod and an indicating device including coacting parts operatively connected with said push button and said rod and operating upon the relative movement thereof.

15. An apparatus for testing the spring power of piston rings including an annular member, means for compressing the piston ring upon the oscillation of said member, an arm secured to said member and having a gear segment, a pinion meshing with said gear segment and having a pointer connected thereto, and a scale juxtaposed to said pointer and calibrated to indicate the reduction in diameter of the piston ring for predetermined oscillatory movement of said member.

16. An apparatus for testing the spring power of piston rings including a member presenting a conical surface for supporting the ring to be tested, and a plurality of radially movable members for engagement with the periphery of the piston ring at spaced points about the periphery of the latter to reduce the diameter of the piston ring and to support said ring free of said conical surface.

17. An apparatus for testing the spring power of piston rings including means for supporting the ring to be tested, a plurality of substantially radial movable rollers for applying pressure at spaced points about the periphery of the piston ring, means for moving said rollers inward simultaneously, said ring being moved out of engagement with said support by the action of said rollers.

18. An apparatus for testing the spring power of piston rings including a housing, a pair of spaced concentric cylindrical flanges, a series of bell crank levers pivotally supported on the inner flange and having their inner ends adapted to engage with the periphery of the piston ring to be tested, and an operating ring mounted between said flanges and having guides for operative engagement with the outer ends of said levers whereby the piston ring is compressed upon the oscillation of said operating ring.

19. An apparatus for testing the spring power of piston rings including a housing having a pair of spaced concentric cylindrical flanges, a series of bell crank levers pivotally supported on the inner flange and having their inner ends adapted to engage with the periphery of the piston ring to be tested, an operating ring mounted between said flanges and having guides for operative engagement with the outer ends of said levers whereby the piston ring is compressed upon the oscillation of said operating ring, a pivotally mounted indicating member carried by said housing, and means for operating the latter upon the oscillation of said ring.

20. An apparatus for testing piston rings including a support for the ring to be tested and a plurality of radially movable members for compressing the ring and simultaneously freeing it from said support.

21. An apparatus for testing piston rings having means including a member movable to reduce the diameter of the ring, indicating means showing the diameter of the ring for each position of said member and indicating means for showing the force required to move said member to each of said positions.

Signed at St. Gallen, in the Canton of St. Gallen, Switzerland, this 30th day of March. A. D. 1921.

JEAN LAESSKER.